Feb. 11, 1964 L. MINTZER 3,121,172

ELECTRICAL PULSE MANIPULATING APPARATUS

Filed Feb. 17, 1959 3 Sheets-Sheet 1

INVENTOR.
LESTER MINTZER
BY Henry L. Hanson
ATTORNEY

INVENTOR.
LESTER MINTZER
BY Henry L. Hanson
ATTORNEY

INVENTOR.
LESTER MINTZER
BY Henry L. Hanson
ATTORNEY

United States Patent Office 3,121,172

Patented Feb. 11, 1964

3,121,172
ELECTRICAL PULSE MANIPULATING APPARATUS

Lester Mintzer, Newton Center, Mass., assignor to Minneapolis-Honeywell Regulator Company, Minneapolis, Minn., a corporation of Delaware Filed Feb. 17, 1959, Ser. No. 793,880
8 Claims. (Cl. 307—88)

A general object of the present invention is to provide a new and improved digital data manipulating circuit which utilizes bistable magnetic core elements in combination with new and novel coupling circuitry. More specifically, the present invention is concerned with a new and improved coupling link between a pair of bistable magnetic core elements which is characterized by the coupling circuit being effective to provide optimum discrimination against unwanted noise and power for driving a large number of core elements on the output thereof.

Bistable magnetic core devices are widely used for storing and transferring digital data. When bistable magnetic core devices are utilized in a shift register configuration wherein data from one core device is shifted into another during an operational cycle; it has generally been the practice heretofore to utilize some type of a storage link between the core devices so that an electrical signal shifted from one core may be temporarily stored in the network and then read into the core which follows. One of the difficulties encountered with circuitry heretofore known has been the severity of the specifications with respect to the core devices. In this regard, core devices whose hysteresis characteritsics were not within predetermined limits could not be utilized, particularly where fairly complex logical arrangements were contemplated. Another problem associated with bistable magnetic core devices has been the problem of eliminating the effects of unwanted signals in the circuitry. Unwanted signals are generally produced by a bistable core device receiving a shift pulse which tends to drive the core into the saturated state to which it is already switched. There is, in substantially all cores, a pulse output which, if not appropriately eliminated, can adversely affect circuitry associated with the output of the core device.

In accordance with the teachings of the present invention, there is provided a means which insures that only the output from the core device which occurs when it is switched from one stable state to the other will be transferred on to subsequent core devices. In this regard, the circuitry of the present invention has been so arranged that the magnetic core devices utilized may be selected with widely varying rectangular hysteresis characteristics so that core devices of the ferro-magnetic type or of the metallic tape type may be used. The circuitry of the present invention is further so arranged that the output winding associated with any bistable core device will not be appreciably loaded by the output circuitry. This is achieved by utilizing an integrator circuit which is voltage responsive. This signal is actually representative of the state of the core flux. Associated with the output of the integrator circuit is an appropriate signal level sensing device which is adapted to be triggered or fired into operation if the signal level on the output level of the integrator is greater than a predetermined amount. By utilizing an amplifying device in the position of the voltage level sensing circuit, it is possible for this amplifying device to drive the inputs of a number of core devices.

It is therefore a further more specific object of the present invention to provide a new and improved coupling circuit for a magnetic core circuit which comprises an integrator and a signal level sensing circuit.

Another more specific object of the present invention is to provide a new and improved coupling circuit for a magnetic core circuit wherein the coupling circuit comprises an integrator working in combination with a signal level-sensitive amplifier device which is adapted to be triggered to a predetermined operative state in the event that the signal level from the integrator exceeds a predetermined amount.

The principles of the present invention are also applicable to the performance of certain types of logical functions with magnetic core devices. Thus, signals may be buffered or gated together by appropriately relating the outputs of a plurality of core devices with an integrator circuit so that the combined outputs will be indicative of the particular logical function desired.

It is accordingly a further more specific object of the invention to provide a new and improved magnetic core logical circuit wherein a plurality of magnetic core devices may be associated on their outputs with a signal integrator to provide selected logical functions.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
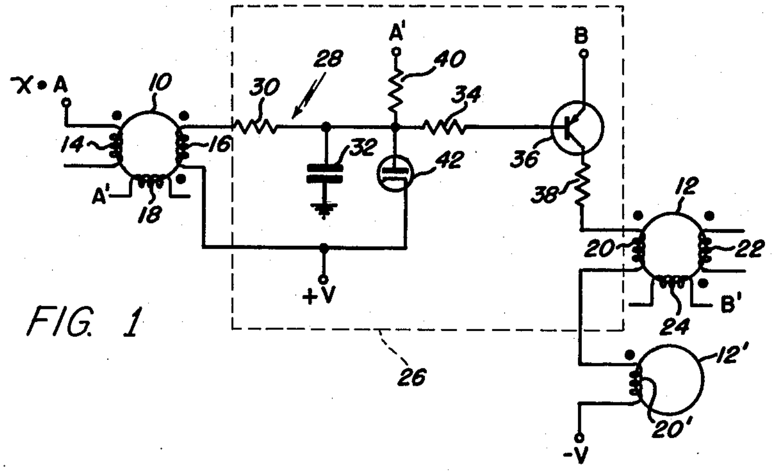
FIGURE 1 is a diagrammatic representation of one form of signal transfer circuit using the principles of the present invention.

Referring first to FIGURE 1, the numerals 10 and 12 represent bistable magnetic core devices of the type having substantially rectangular hysteresis characteristics. The core device 10 has an input winding 14, an output winding 16, and a shift winding 18. Core device 12 has an input winding 20, an output winding 22, and a shift winding 24. Each of the core devices 10 and 12 are so arranged that when a predetermined input signal is applied to the input winding, the core device 10 will be switched to a predetermined state of saturation and then will remain in that state until such time as a shift pulse is applied to a shift winding. When the core is switched from one stable state to the opposite stable state, an output signal will appear on the output winding.

A coupling circuit 26 is provided between the core devices 10 and 12. This coupling circuit 26 comprises an integrator circuit 28 which includes a resistor 30 and a condenser 32. A resistor 34 couples the output of the integrator circuit 28 to the input of the transistor device 36 having the normal base, emitter, and collector electrodes. The emitter-collector electrode circuit of the transistor 36 is connected in series with the input windings of the core devices 12 and 12′ by way of a resistor 38.

Also coupled to the output of the integrator circuit 28 is a clamping or resetting circuit which includes a resistor 40, a diode 42, the latter of which is connected to a voltage supply terminal +V. The other end of the resistor 40 is connected to a pulse signal source A′.

The shift winding of the core 10 is also associated with the pulse signal source A′ and is adapted to be shifted when the signal on A′ is present. A further signal source B is associated with the transistor 36.

Figure 2:
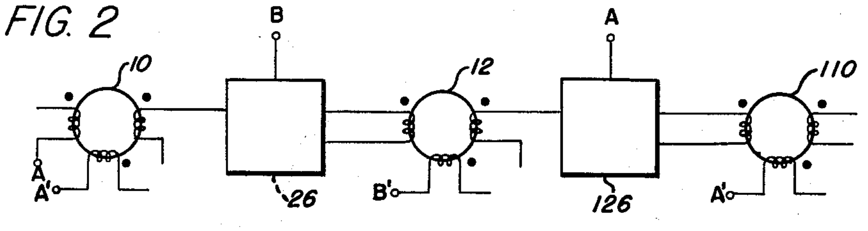
FIGURE 2 is a diagrammatic representation of the invention applied to the shift register circuit.

Before considering the operation of FIG. 1, reference should be made to FIGURE 2 wherein the basic circuit illustrated in FIGURE 1 is extended to three magnetic core devices. Added to the circuit of FIGURE 1 is an additional magnetic core device 110 which is coupled to the core device 112 by way of a coupling link 126. The coupling link 126 and the core device 110 are basically the same as the core devices 10 and the coupling link 26.

Figure 3:
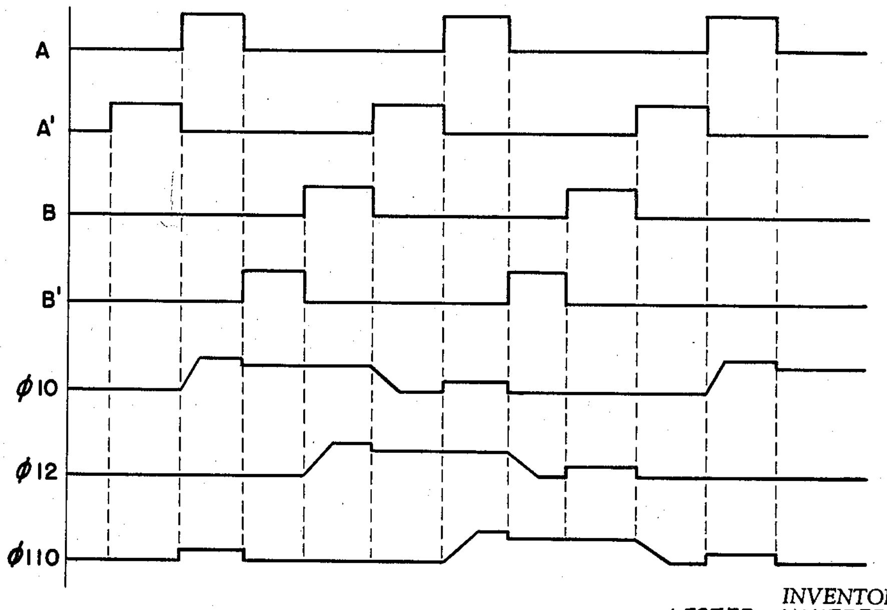
FIGURE 3 illustrates wave forms associated with FIGURES 1 and 2.

In considering the operation of the circuitry shown in FIGURES 1 and 2, reference should be made to FIGURE 3 wherein the related wave forms associated with the circuit operation are illustrated for a number of the aforesaid operational cycles. It is first assumed that each of the core devices are in the reset state. Thus, an input shift pulse from the shift pulse source A′ and B′ will not produce an output signal of sufficient magnitude to cause any coupling of signals into the next core devices of the circuitry. As is well known, when a shift pulse is applied to a core which is already shifted in the direction related to the particular shift pulse, there will be a slight output on the output winding of the associated core. For example, when a shift pulse A′ is applied to the winding 18 of the core 10, assuming the core is already in the reset state, there will be a change of flux in the core device 10 and resultant output signal on the winding 16. In the present circuit, the signal on the winding 16 will be integrated by the integrator 28.

The transistor 36 is connected in the circuit as a signal level sensing device which is capable of producing a desired output when the level of the signal on the output of the integrator 28 exceeds a predetermined amount. The transistor 36 will be held in a cutoff state for the reason that the base electrode thereof is coupled to a biasing source +V by way of the output winding 16, resistor 30, and resistor 34. As soon as the level of the voltage on the condenser 32 on the output of the integrator 28 builds up to a predetermined value, the transistor 36 will be switched into a conducting state, at which time the current flowing in the emitter-collector circuit thereof can be used for setting one of more cores such as the cores 12 or 12′. It will be noted, however, that the firing of the transistor 36 is also related to the switching pulse B. Under the conditions assumed thus far, the application of the switching pulse B will produce no output current from the transistor 36 for the reason that the output from the previous core device 10, the signal on the condenser 32, is less than that necessary to cause a firing of the transistor 36.

It is next assumed that there is an input signal on the input winding 14 which is effective to set the core 10. With the input signal from the source A switching the core 10, the flux in the core 10 will be as indicated in FIGURE 3. The flux will remain set in the core even after the signal pulse A has been eliminated, although the level of the flux will drop back to the residual saturated point. The integrator 28 will integrate the output signal from the core 10 and, when the signal B is applied to the transistor 36, the transistor 36 will be switched into a conductive state for the reason that the potential on the base electrode thereof will be sufficient to bias the transistor into the conductive region. Thus, a signal may then be read into the core 12 and the core 12′.

Immediately following the readin of the signal, the signal A′ will be effective to reset the core 10 and the core will remain reset until such time as a further A pulse is received, in combination with an appropriate trigger pulse, in the manner indicated in FIGURE 3.

When the gating pulse B appears, assuming the transistor 36 is biased to be conductive, the transistor 36 will conduct in its output emitter-collector circuit and produce an appropriate setting action in the core devices 12 and 12′. Thus, the flux in the core devices will be as indicated in FIGURE 3. When the circuit is connected as illustrated in FIGURE 2, the application of the next A pulse to the coupling circuit 126 will have the effect of switching the core device 110 so that its flux will now be switched into the set state. Immediately following the A pulse, the B′ pulse is effective to reset the core device 12.

This circuit operation may be arranged to continue through a plurality of like stages, as indicated in FIGURE 2, or it may be arranged to cooperate with appropriate logical circuitry as illustrated in the FIGURES 6 through 9 which are discussed below.

Figure 4:
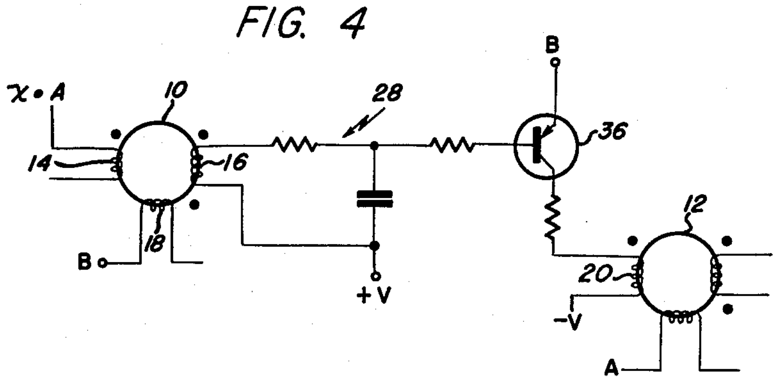
FIGURE 4 is a modified schematic of a form of the invention similar to that of FIGURE 1.
Figure 5:
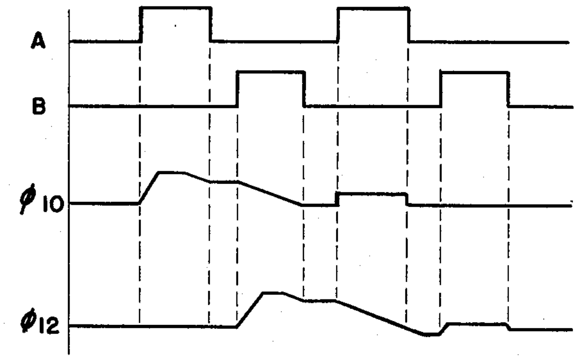
FIGURE 5 illustrates representative wave forms associated with the apparatus of the type shown in FIGURE 4.

Referring next to FIGURE 4, there is here illustrated a modified form of the circuitry shown in FIGURE 1 wherein the number of pulse sources required for the circuit to operate has been reduced to two. The circuit modification has been arranged so that there is no resetting circuit provided for the integrator 28. In the present circuit, the electrical components are so selected and the timing of the pulse sources selected so that when the signal pulse is applied to the terminal B on the transistor 36, when the transistor is biased into the conductive state, there will be a current flowing in the base-emitter circuit which will be effective to reset the integrator 28 to a predetermined voltage level. Components corresponding to those of FIGURE 1 carry the same reference numerals in FIGURE 4. Further, the wave forms associated with FIGURE 4 are illustrated in FIGURE 5.

In considering the operation of FIGURE 4, it is first assumed that there is no input signal for setting the core 10. With both of the cores 10 and 12 reset, the application of the pulse signals from the sources A and B on the respective shift windings of the cores 10 and 12 will not produce sufficient output to result in any signal passing between the core stages or to subsequent cores that may be connected thereto. As with FIGURE 1, the integrator circuit 28 is arranged to integrate the output from the core winding 16 and unless the value on the output of the integrator is sufficient to cause the transistor 36 to be rendered conductive, the transistor will not be effective to provide enough current for the input of the core device 12.

It is next assumed that the input signal source A, in cooperation with a further gating signal, is effective to set the core 10. The core device 10 will then be switched into the set state and the flux therein will be in the manner indicated in FIGURE 5 for the core 10. The core will tend to remain set until such time as the shift pulse is applied from the shift pulse source B which then switches the core in the opposite direction, again as indicated in FIGURE 5. At the same time, the output of the integrator 28, which is connected to the transistor 36, will be biasing the transistor 36 into the conducting region so that when the pulse source B has a signal thereon, the transistor 36 will be switched to the conductive state and the core 12 will then be switched into the set state by the current flowing in the emitter-collector circuit of the transistor 36. It should be noted that the flux $\phi 10$ resets via pulse B on winding 18 at a slower rate than the setting of flux $\phi 12$ via winding 20. As the transistor 36 is switched to the conductive state, the current flowing in the base-emitter circuit will be effective to reset the integrator 28 so that it will be ready for the next signal appearing on the output winding of the core device 10.

It will be apparent that the principles set forth in FIGURE 4 may be extended to a multiple core register in the manner indicated in FIGURE 2.

Figure 6:
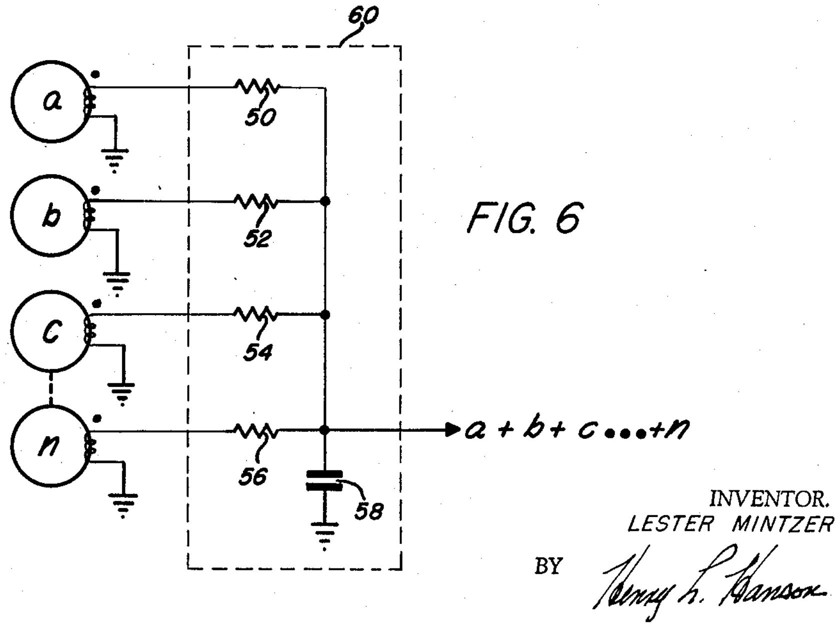
FIGURE 6 illustrates a diagrammatic representation of a signal buffering circuit incorporating the principles of the invention.

The circuitry illustrated in FIGURE 6 represents one manner in which a logical OR function may be implemented using the principles of the present invention. In this figure, the circuitry comprises a plurality of bistable core devices *a, b, c, . . . n*. The output windings of each of these core devices are coupled through summing resistors 50, 52, 54, and 56 to a condenser 58. The resistors and the condenser form an integrating network 60 which is of the same fundamental type as illustrated at 28 in FIGURE 1. The circuit components are selected so that if any one of the core devices has an output signal, this signal will be appropriately integrated in the integrator 60, and when associated with a transistor signal level switching device, again such as illustrated in 36 in FIGURE 1, the transistor may be used to set further core devices. Inasmuch as the circuitry of FIGURE 6 illustrates means for implementing logical OR, the output of the circuit may be represented by the logical statement of $a+b+c \ldots +n$.

Figure 7:
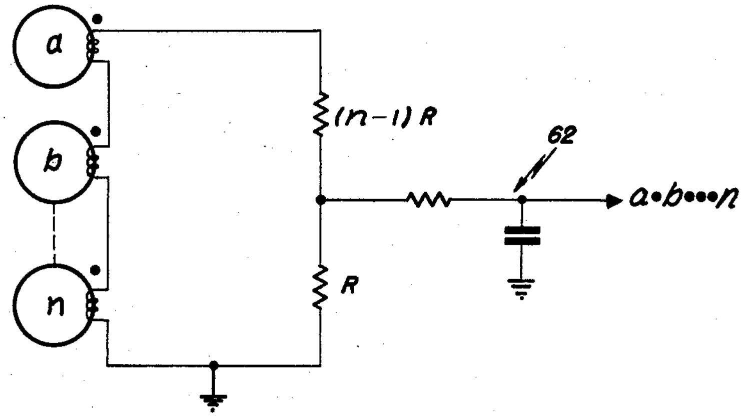
FIGURE 7 illustrates the invention as applied to a signal gating circuit.

FIGURE 7 illustrates one manner in which the circuit may be used to implement a logical AND function. In this case, the output windings of a plurality of bistable cores devices *a, b, . . . n* are all connected in series. The output of the series connected windings are summed by way of the resistor R and a further resistor $(N-1)R$ and applied to the integrator circuit 62. The output of the integrator will once again be connected to a suitable signal level sensing circuit which is arranged so that it will not produce an output signal unless each of the core devices *a* through *n* have raised the signal level in the integrator 62 to an appropriate level.

Figure 8:
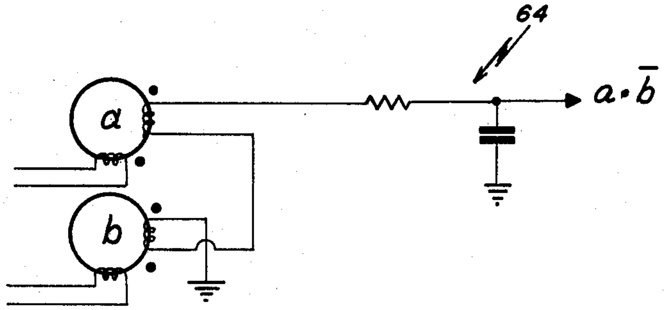
FIGURE 8 illustrates a modified form of logical circuit.

The circuitry illustrated in FIGURE 8 is a form of the apparatus which may be used to implement the logical statement of $a \cdot \bar{b}$. This circuitry may be implemented by connecting the output windings of the core devices *a* and *b* so that they are in effect in opposition. These windings are then connected in series with the input of an appropriate integrator circuit 64, the latter of which may, at its output, be connected to an appropriate signal level sensing circuit in the manner indicated in FIGURES 1 and 4.

Figure 9:
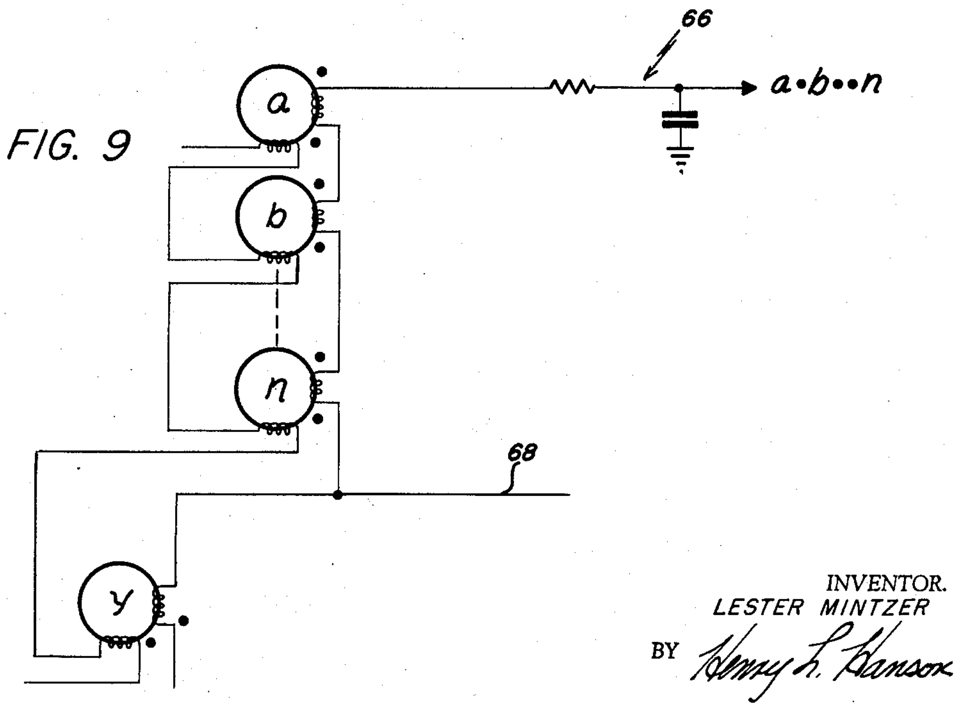
FIGURE 9 represents a form of the invention wherein the circuit incorporates a signal suppressing element.

The circuitry illustrated in FIGURE 9 is a modification of the logical AND circuit illustrated in FIGURE 7. In this particular figure, the logic to be performed will be by way of the output windings from the core devices *a, b, . . . n*. The windings from these core devices are connected in series to an integrator circuit 66, the output of which may be connected to a signal level sensing device. Inasmuch as the making of a practical circuit of the type illustrated in FIGURE 9 involves a number of bistable magnetic cores, it is frequently difficult to select cores having identical hysteresis characteristics. For this reason, the outputs of the core devices may be sufficiently different that the total number of such core devices, which can operate in a single circuit, will be limited. To overcome this difficulty, a suppression circuit is provided by way of an additional core device Y, which has an output winding connected in opposition to the output windings from the logical core devices *a* through *n*. This circuit provides for the suppression of the signal going into the integrator 66 unless all of the core devices have the desired output. The core device Y may be used in conjunction with other logical circuits by way of the extension lead 68.

In all of the core circuits illustrated, it will be apparent that the integrator circuits associated wtih the output windings of the core devices do not appreciably load the output windings. Further, the signal level sensing device, which, as illustrated, is an amplifier, is capable of driving a large number of core devices without requiring power from the preceding core device. This greatly enhances the adaptability of this circuit for use in a large number of applications.

While, in accordance with the provisions of the statutes, there have been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and which it is desired to secure by Letters Patent is:

1. A coupling link for use between an output winding of a first magnetic core and the input windings of successive magnetic cores comprising a resistor-capacitor integrator circuit adapted to be connected to said output winding, a transistor having base, emitter, and collector electrodes, D.C. biasing means connected to said transistor base electrode for constantly biasing said transistor to cause the latter to be normally nonconductive in the emitter-collector electrode circuit, means adapted to connect said emitter-collector electrode circuit to said input windings, and means connecting said integrator to said transistor base electrode to overcome the effect of said biasing means when the output from said first recited winding is greater than a predetermined amount.

2. An electrical digital signal manipulating circuit comprising a pair of bistable magnetic core devices each having an input winding, an output winding, and a shift winding, an integrator circuit, means connecting said integrator circuit to the output winding of said first core device, an amplifier device having an input and an output, means for constantly applying a fixed biasing voltage to said amplifier device to cause the latter to be normally nonconducting in the output thereof, means connecting the output of said amplifier device to the input winding of said second core device, and means connecting said integrator circuit to the input of said amplifier device.

3. An electrical digital signal manipulating circuit comprising a pair of bistable magnetic core devices each having an input winding, an output winding, and a shift winding, an integrator circuit, means connecting said integrator circuit to the output winding of said first core device, an amplifier device having an input and an output, means for constantly applying a fixed biasing voltage to said amplifier device to cause the latter to be normally nonconducting in the output thereof, means connecting the output of said amplifier device to the input winding of said second core device, means connecting said integrator circuit to the input of said amplifier device, and reset means connected to said integrator circuit for selectively energizing the latter to periodically establish a preselected voltage level therein.

4. An electrical signal manipulating circuit adapted to transfer digital data during an operational cycle comprising a pair of bistable magnetic core devices each having an input winding, an output winding, and a shift winding, an integrator circuit, means connecting said integrator circuit to the output winding of said first core device, an amplifier device having an input and an output, means for applying a D.C. biasing voltage to said amplifier device throughout said operational cycle to cause the latter to be nonconducting in the output thereof, means connecting the output of said amplifier device output to the input winding of said second core device, means connecting said integrator circuit to the input of said amplifier device, and a gating signal source connected to said amplifier device to activate said amplifier device during a selected portion of said operational cycle.

5. A digital data manipulating circuit as in claim 2 and further comprising a plurality of bistable magnetic core devices connected substantially identically to said first core device and including the latter, said integrator circuit comprising a plurality of impedance elements of one type connecting the output windings of said plurality of core devices in parallel with each other and in series with a further impedance element of a second type.

6. A digital data manipulating circuit as in claim 2 and further comprising a plurality of bistable magnetic core devices connected substantially identically to said first core device and including the latter, said integrator circuit comprising a plurality of resistance elements connecting the output windings of said plurality of core devices in parallel with each other and in series with a condenser element.

7. A digital data manipulating circuit as in claim 2 and further comprising a plurality of bistable magnetic core devices connected substantially identical to said first core device and including the latter, and circuit means connecting the output windings of said plurality of core devices in a series circuit to said integrator circuit.

8. Apparatus as defined in claim 7 wherein a further bistable core device has an output winding connected to said series circuit in opposition to the normal signals in said series circuit to maintain the signal on the input of said amplifier device below a selected level in the absence of a predetermined output from said plurality of core devices.

References Cited in the file of this patent

UNITED STATES PATENTS

| | | |
|---|---|---|
| 2,644,893 | Gehman | July 7, 1953 |
| 2,833,938 | Pinckaers | May 6, 1958 |
| 2,863,138 | Hemphill | Dec. 2, 1958 |
| 2,864,007 | Clapper | Dec. 9, 1958 |
| 2,876,438 | Jones | Mar. 3, 1959 |
| 2,879,412 | Hoge et al. | Mar. 24, 1959 |
| 2,902,609 | Ostroff et al. | Sept. 1, 1959 |
| 2,904,780 | Meyerhoff | Sept. 15, 1959 |
| 2,905,833 | Miehle | Sept. 22, 1959 |
| 2,906,926 | Bauer | Sept. 29, 1959 |
| 2,926,339 | Kramer | Feb. 23, 1960 |
| 2,935,735 | Kodis et al. | May 3, 1960 |
| 2,942,123 | Schuh | June 21, 1960 |
| 2,949,547 | Zimmerman | Aug. 16, 1960 |
| 2,949,582 | Silliman | Aug. 16, 1960 |
| 2,963,688 | Amemiya | Dec. 6, 1960 |
| 3,063,038 | Davis | Nov. 6, 1962 |